United States Patent
Bai et al.

(10) Patent No.: US 10,487,255 B1
(45) Date of Patent: Nov. 26, 2019

(54) EXPANDABLE PLUGGING AGENT AND PREPARATION METHOD THEREOF, MICRO-CAPSULE PLUGGING AGENT, WATER-BASED DRILLING FLUID, AND USE THEREOF

(71) Applicant: Southwest Petroleum University, Chengdu (CN)

(72) Inventors: Yang Bai, Chengdu (CN); Pingya Luo, Chengdu (CN); Jinsheng Sun, Qingdao (CN); Guancheng Jiang, Beijing (CN); Jiading Deng, Chengdu (CN); Yan Cheng, Chengdu (CN); Guojun Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/285,783

(22) Filed: Feb. 26, 2019

(30) Foreign Application Priority Data

Jan. 14, 2019 (CN) .......................... 2019 1 0031589

(51) Int. Cl.
*C09K 8/512* (2006.01)
*C09K 8/42* (2006.01)
*C09K 8/44* (2006.01)

(52) U.S. Cl.
CPC .............. *C09K 8/426* (2013.01); *C09K 8/44* (2013.01); *C09K 2208/04* (2013.01); *C09K 2208/30* (2013.01)

(58) Field of Classification Search
CPC ...... C09K 8/426; C09K 8/145; C09K 8/5083; C09K 2208/08; C09K 8/68; C09K 8/88; C09K 2208/10; C09K 8/032; C09K 8/035; C09K 8/16; C09K 8/206; C09K 8/34; C09K 8/36; C09K 8/467; C09K 8/80; C09K 2208/26; C09K 2208/34; C09K 8/10; C09K 8/12; C09K 8/24; C09K 8/502; C09K 8/512; C09K 8/514; C09K 8/64; C09K 8/665; C09K 8/706; C09K 11/883; C09K 2208/12; C09K 2208/18; C09K 2208/24; C09K 2208/28; C09K 2208/30; C09K 3/00; C09K 8/04; C09K 8/05; C09K 8/08; C09K 8/22; C09K 8/26; C09K 8/42; C09K 8/46; C09K 8/473; C09K 8/48; C09K 8/487; C09K 8/493; C09K 8/50; C09K 8/5045; C09K 8/506; C09K 8/508; C09K 8/5086; C09K 8/516; C09K 8/52; C09K 8/572; C09K 8/575; C09K 8/60; C09K 8/602; C09K 8/605; C09K 8/62; C09K 8/66; C09K 8/685; C09K 8/72; C09K 8/82; C09K 8/845; C09K 8/887; C09K 8/90; C09K 8/92

See application file for complete search history.

(56) References Cited

U.S. PATENT DOCUMENTS

| | | | | |
|---|---|---|---|---|
| 4,157,992 A | * | 6/1979 | Lundberg | ................ C08L 23/32 524/322 |
| 6,196,317 B1 | * | 3/2001 | Hardy | .................... C09K 8/512 166/295 |
| 2011/0114318 A1 | * | 5/2011 | Ezell | .................... C09K 8/5045 166/305.1 |

FOREIGN PATENT DOCUMENTS

| CN | 101838837 | * | 9/2010 |
|---|---|---|---|
| CN | 109181658 | * | 1/2019 |

OTHER PUBLICATIONS https://www.ptonline.com/knowledgecenter/ plastics-feeding/application-profiles downloaded on May 16, 2019.*

* cited by examiner

*Primary Examiner* — Kumar R Bhushan
(74) *Attorney, Agent, or Firm* — Volpe and Koenig, P.C.

(57) ABSTRACT

An expandable plugging agent is described. The expandable plugging agent is obtained through a polymerization reaction of acrylamide, a strength improving material, an acrylate, and gelatinized colloid, the acrylate is obtained through a neutralization reaction of an acidity neutralizer and acrylic acid, and the gelatinized colloid is obtained through a gelatinization reaction of starch in deionized water.

16 Claims, No Drawings

US 10,487,255 B1

EXPANDABLE PLUGGING AGENT AND PREPARATION METHOD THEREOF, MICRO-CAPSULE PLUGGING AGENT, WATER-BASED DRILLING FLUID, AND USE THEREOF

CROSS COMPARATIVE TO RELATED APPLICATIONS

The application claims priority to Chinese Application No. 201910031589.4, field on Jan. 14, 2019, entitled "expandable plugging agent and preparation method thereof, micro-capsule plugging agent, water-Based drilling fluid, and application Thereof", which is specifically and entirely incorporated herein by comparative.

FIELD OF THE INVENTION

The present invention relates to the field of drilling fluid additives, particularly to an expandable plugging agent, a preparation method of the expandable plugging agent, a micro-capsule plugging agent, a water-based drilling fluid, and an use of the expandable plugging agent, the micro-capsule plugging agent, and the water-based drilling fluid.

BACKGROUND OF THE INVENTION

Lost circulation is a complex downhole situation in which the working fluid leaks into the formation in drilling engineering, and is one of the most common and frequently encountered complex problems in drilling operations. Lost circulation is always a problem of great concern in the petroleum industry in China and foreign countries, because the complex downhole situations incurred by lost circulation are very harmful to well drilling and completion work. Once lost circulation occurs in drilling operations, it not only causes delayed drilling, loss of the drilling fluid, and damages to the oil and gas reservoir, and hinders the normal operation of geological logging, but also may cause wellbore instability and consequently result in a series of complex situations and accidents, such as well collapse, jamming of drilling tools, and well blowout, etc. If improperly handled, it may even result in abandonment of the well and severe economic losses. It is very important to handle lost circulation timely and maintain normal drilling. Therefore, it is highly necessary to develop new plugging agents.

Plugging materials are indispensable materials in the leak prevention and plugging process in drilling engineering.

Among the plugging materials, the most widely used water-absorbing polymer is hydrolyzed polyacrylamide (HPAM), but HPAM may cause pumping difficulties and affect the performance of the drilling fluid when it is used in plugging operation because its water absorption rate is too high. Consequently, a part of the plugging agent can't enter into the leakage zone and thereby causes a compromised plugging effect because its particle size is too large. In some large fractures and high-permeability formations, the strength of the water-absorbent resin can't meet the plugging requirement. Hence, it is not ideal to solely use a polymer gel system for plugging operation.

Among the plugging materials, chemical plugging materials mainly refer to plugging agents that mainly consist of polymers. Chemical plugging materials may be generally categorized into gels, resins, and expandable polymers, wherein, the expandable polymers mainly include SYZ expandable plugging agents, polyurethane foam expandable plugging agents and TP-9010. These three kinds of expandable polymers absorb water and expand after they enter into a leakage zone, and thereby plug up the leakage zone. However, they absorb hydrocarbons while absorbing water.

Therefore, it is of great significance to study and develop water-absorbing and hydrocarbon-resistant polymers for leak plugging.

SUMMARY OF THE INVENTION

To solve the problems of frequent occurrence of lost circulation (especially serious lost circulation) and unsatisfactory plugging effect in the well drilling process in the prior art, the present invention provides an expandable plugging agent, a preparation method of the expandable plugging agent, a micro-capsule plugging agent, a water-based drilling fluid, and a use of the expandable plugging agent, the micro-capsule plugging agent, and the water-based drilling fluid. The expandable plugging agent for drilling fluid provided in the present invention has a stable structure, high strength, and high viscoelasticity, is stable in downhole high-pressure and high-temperature environments, and can attain a good plugging effect.

To attain the objects described above, in a first aspect, the present invention provides an expandable plugging agent for drilling fluid, which is viscoelastic gel obtained through a polymerization reaction of first acrylic acid, acrylamide, acrylate, a strength improving material, and gelatinized colloid in the presence of a cross-linking agent and an initiating agent, wherein the acrylate is obtained through a neutralization reaction of an acidity neutralizer and acrylic acid, and the gelatinized colloid is obtained through a gelatinization reaction of starch in deionized water.

In a second aspect, the present invention provides a method for preparing the above-mentioned expandable plugging agent, which comprises the following steps:

(1) adding starch into deionized water to have a gelatinization reaction to obtain gelatinized colloid;

(2) adding an acidity neutralizer and acrylic acid to have a neutralization reaction to obtain an acrylate;

(3) controlling first acrylic acid, acrylamide, the acrylate, a strength improving material, and the gelatinized colloid to have a polymerization reaction in the presence of a cross-linking agent and an initiating agent.

In a third aspect, the present invention provides a micro-capsule plugging agent for drilling fluid, comprising an intra-capsular material and a capsular enclosure material that encloses the intra-capsular material, wherein the intra-capsular material is the above-mentioned expandable plugging agent or the expandable plugging agent prepared with the above-mentioned method, the capsular enclosure material is one or more of paraffin, stearic acid, bee wax, Japan wax, long-chain alcohol, polyethylene with number-average molecular weight lower than 5,000 g/mol, solidified oil, and deformable resin, preferably is paraffin; preferably, the dose ratio of the capsular enclosure material to the intra-capsular material is (2-5):1.

In a fourth aspect, the present invention provides a water-based drilling fluid containing the above-mentioned expandable plugging agent or the expandable plugging agent prepared with the above-mentioned method and the above-mentioned micro-capsule plugging agent; preferably, based on the total weight of 100 mL water-based drilling fluid, the content of the expandable plugging agent is 10-12 wt %, or the content of the micro-capsule plugging agent is 6-8 wt %.

In a fifth aspect, the present invention provides a method of drilling in oil and gas fields, wherein use of the above-mentioned expandable plugging agent or the expandable plugging agent prepared with the above-mentioned method and the above-mentioned micro-capsule plugging agent.

With the above technical scheme, low-cost starch is introduced in the expandable plugging agent in the present invention based on water-absorbent resin synthesized from acrylic acid, acrylamide, and acrylate, so that the finally synthesized expandable plugging agent has excellent degradability; in addition, a strength improving material is added in the system and dispersed uniformly in gel to attain a skeleton and supporting effect, so as to improve the strength and stability of the gel; moreover, in the present invention, a capsular enclosure material is employed and the expandable plugging agent is processed to capsule size and prepared into a micro-capsule plugging agent by spraying, condensing, or soluble coating, and then the micro-capsule plugging agent is added into mud and pumped to the loss zone; after a while, the capsular enclosure material is dissolved or melted under the downhole temperature condition and the expandable plugging agent is released, absorbs water in the formation or mud in the well and expands quickly; thus, the expandable plugging agent attains a synergetic effect with the components in the plugging system and thereby greatly improves the plugging effect of the plugging system.

In addition, the expandable plugging agent and/or microcapsule plugging agent in the present invention has low cost, is easy and simple to use, and doesn't require drilling stop. Therefore, the plugging agent in the present invention greatly reduce the lost circulation handling time and cost for oil and gas wells, and is of great significance to improve the drilling rate and reduce the drilling cost in leaking formation.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provides an expandable plugging agent for drilling fluid, which is viscoelastic gel obtained through a polymerization reaction of first acrylic acid, acrylamide, acrylate, a strength improving material, and gelatinized colloid in the presence of a cross-linking agent and an initiating agent, wherein the acrylate is obtained through a neutralization reaction of an acidity neutralizer and second acrylic acid, and the gelatinized colloid is obtained through a gelatinization reaction of starch in deionized water.

According to the present invention, it should be noted that both the first acrylic acid and the second acrylic acid are acrylic acid and commercially available. In the present invention, they are defined as "first acrylic acid" and "second acrylic acid" for a differentiation purpose, i.e., the "first acrylic acid" is used as a component and mainly participates in the reaction with acrylamide and acrylate, while the "second acrylic acid" mainly participates in the neutralization reaction with the acidity neutralizer to prepare an acrylate.

According to the present invention, the apparent viscosity of the gelatinized colloid obtained through gelatinization of starch may be 20-50 mPa·s. In addition, in the present invention, the starch may be maize starch.

According to the present invention, based on 100 parts by weight deionized water, the first acrylic acid and the acrylamide are in 1-15 parts by weight total amount, the starch is in 1-10 parts by weight, the acidity neutralizer is in 0.5-5 parts by weight, the cross-linking agent is in 0.1-0.8 parts by weight, the initiating agent is in 1-9 parts by weight, and the strength improving material is in 20-70 parts by weight.

According to the present invention, by strictly controlling the contents of the components so that the components interact with each other so that the prepared expandable plugging agent can exert the best efficacy in the plugging process and thereby the prepared expandable plugging agent for drilling fluid has stable structure, high strength, and high viscoelasticity, is stable in the high-pressure and high-temperature downhole environment, and can attain a good plugging effect; however, a better effect can be attained if the first acrylic acid and the acrylamide are in 6-8 parts by weight total amount, the starch is in 4-6 parts by weight, the acidity neutralizer is in 2-3 parts by weight, the cross-linking agent is in 0.3-0.5 parts by weight, the initiating agent is in 4-5 parts by weight, and the strength improving material is in 50-60 parts by weight, based on 100 parts by weight deionized water.

According to the present invention, the inventor of the present invention has found: if acrylic acid (AA) is solely used in the polymerization reaction, the water absorption multiple and water absorption rate of the synthesized expandable plugging agent are not ideal and hard to meet the actual application requirement, and the water absorption multiple of the synthesized product in saline solution is very low and the salt resistance property is poor. Therefore, another monomer is introduced to have copolymerization with the acrylic acid (AA) and the acrylate, so as to improve the properties of the obtained polymer by modifying the internal structure of the polymer, and thereby the polymer may be applied widely in a variety of fields; at the same time, low-cost starch is introduced so that the finally synthesized expandable plugging agent has high degradability. In the present invention, with the gelatinized colloid obtained through a gelatinization reaction of starch in deionized water and the viscoelastic gel obtained through a polymerization reaction of the first acrylic acid, the acrylate, the strength improving material, and the gelatinized colloid by introducing a non-ionic monomer acrylamide (AM), the synthesized expandable plugging agent not only has improved water absorption multiple and improved water absorption rate, but also has improved salt resistance; in addition, not subsequent treatment is required when the expandable plugging agent is applied in the field, owing to the good degradability of the expandable plugging agent.

According to the present invention, as the proportion of the acrylamide (AM) is increased, the water absorptivity of the expandable plugging agent is increased accordingly, because the polymer synthesized through copolymerization of AA and AM has hydrophilic groups —$CONH_2$ and —COOH in its molecular chain, which interact with —COONa and/or —COOCa and attain an obviously better effect when compared with a single group, and thereby the molecular chain of the polymer can stretch in a better way. As more AM is added, the amount of the —$CONH_2$ group contained in the system is increased, and thereby the water absorptivity can be improved and the salt resistance can be enhanced. However, as the amount of AM is further increased, the water absorptivity of the polymer exhibits a down trend, because excessive —$CONH_2$ group causes increased cross-linking density of the expandable plugging agent, and consequently the micro-pores in the three-dimensional mesh structure of the polymer are decreased in size and the molecular chains are in a curved state, resulting in decreased water absorptivity. Therefore, in the present invention, the inventor of the present invention has found through scientific research: a better effect can be attained when the mass ratio of the first acrylic acid to the acrylamide is confined to (0.4-0.8):1, preferably (0.4-0.7):1, more preferably (0.6-0.67):1, i.e., in the present invention, by strictly controlling the contents of the first acrylic acid and the acrylamide, the prepared expandable plugging agent can have stable structure, high strength, and high viscoelasticity, is stable in the high-pressure and high-temperature downhole environment, and can attain a good plugging effect.

According to the present invention, the starch mainly provides skeletons and active sites that can be initiated by an initiating agent in the polymerization process, so that it can react with AA-AM, and thereby forms a cross-linked mesh structure. If the amount of the starch is not enough, the active sites will not be enough, and the excessive first acrylic acid and acrylamide will be homo-polymerized and will have an adverse effect to the formation of the mesh structure in the product; consequently, the gel strength of the product will be decreased after water absorption, and the degradation efficiency of the product will be affected; if the amount of the starch is excessive, the excessive starch can't participate in the reaction, and will cause decreased grafting ratio of the product; consequently, the gel strength of the product after water absorption will also be affected. Therefore, the effect is the best under the condition of the defined content of starch in the present invention.

According to the present invention, preferably, the acidity neutralizer may be sodium hydroxide and/or calcium oxide; more preferably, the acidity neutralizer is sodium hydroxide.

According to the present invention, the cross-linking agent may be one or more of N,N-methylene-bis acrylamide, N-methylol acrylamide, and diacetone acrylamide; more preferably, the cross-linking agent is N,N-methylene-bis acrylamide. In the present invention, if the amount of the cross-linking agent is too small, an appropriate three-dimensional mesh structure can't be formed, the dissoluble components in the polymer may be increased, and both the water absorptivity and the water retentivity may be decreased; however, if the amount of the cross-linking agent is too great, the three-dimensional mesh structure will be dense and the mesh spaces will be too small, the absorbed liquid is hard to enter into the polymer; consequently, the water absorptivity will be decreased, and the elasticity of the polymer after water absorption will be degraded. Therefore, the effect is the best under the conditions of the defined cross-linking agent and the defined content of the cross-linking agent in the present invention.

According to the present invention, the initiating agent may be a mixture of ammonium persulfate and sodium sulfite; preferably, the mass ratio of the ammonium persulfate to the sodium sulfite is (0.4-0.8):1; in the present invention, not only the content of the initiating agent but also the mass ratio of the ammonium persulfate to the sodium sulfite should be controlled, because the initiating agent not only has influence on the speed of the polymerization reaction but also has influence on the mesh structure of the molecules of the polymer; if the amount of the initiating agent is too small, the quantity of free radicals in the reaction system will be too low, and consequently the cross-linking density will be low, it will be difficult to form a three-dimensional mesh structure, the molecular weight of the synthesized polymer will be low, and the water absorptivity will be low. If the amount of the initiating agent is too great, though the speed of the polymerization reaction can be increased, the excessive initiating agent may result in an explosive polymerization phenomenon, and consequently the molecular weight will be decreased, the cross-linking density will be too high, it will be difficult to form a three-dimensional mesh structure, and the water absorptivity will be decreased. Therefore, the effect is the best under the conditions of the defined initiating agent and the defined content of the initiating agent in the present invention.

According to the present invention, the strength improving material is calcium carbonate and/or walnut shell;

Preferably, the calcium carbonate comprises calcium carbonate A and calcium carbonate B, the average particle diameter of the calcium carbonate A is 8-12 μm, and the average particle diameter of the calcium carbonate B is 4-6 μm;

Preferably, the average particle diameter of the walnut shell is 18-22 μm;

Preferably, the mass ratio of the calcium carbonate A to the calcium carbonate B to the walnut shell is (0.4-0.6):(0.4-0.6):1.

According to the present invention, the water absorption multiple of the expandable plugging agent is 150-180, the relative molecular weight is $5\times10^5$ to $8\times10^5$, the elastic modulus is 150,000 $N/cm^2$ to 180,000 $N/cm^2$, and the tensile strength is 4,500 $N/cm^2$ to 5,000 $N/cm^2$.

In a second aspect, the present invention provides a method for preparing the above-mentioned expandable plugging agent, which comprises the following steps:

(1) adding starch into deionized water to have a gelatinization reaction to obtain gelatinized colloid;

(2) adding an acidity neutralizer and acrylic acid to have a neutralization reaction to obtain an acrylate;

(3) controlling acrylamide, a strength improving material, the gelatinized colloid, and the acrylate to have a polymerization reaction in the presence of a cross-linking agent and an initiating agent.

Wherein, in the step (1), the conditions of the gelatinization reaction include: heating in water bath, at 75-95° C. temperature, pH is 7.8-8.6, 1,000-2,000 rpm stirring rate, for 30-45 min.

Wherein, in the step (2), the acrylate is obtained through a neutralization reaction between an acidity neutralizer and second acrylic acid; in the present invention, preferably, the concentration of the acidity neutralizer may be 38-42 wt % (e.g., 38 wt %, 39 wt %, 40 wt %, 41 wt %, 42 wt %, or any value between any two of those values), the dose of the acidity neutralizer is measured according to the dose of the second acrylic acid, and then the neutralization reaction is carried out; in the present invention, more preferably, the acidity neutralizer is added by dropwise adding into the second acrylic acid, wherein the dropwise adding rate may be 1-3 mL/s; even more preferably, in the process of adding the acidity neutralizer by dropwise adding into the second acrylic acid, the mixture is stirred continuously with a glass rod, wherein, the stirring rate may be 1,000-2,000 rpm, preferably is 1,400-1,500 rpm.

According to the present invention, the neutralization reaction is controlled under a condition of ice water bath at 10-15° C. temperature and 1,000-2,000 rpm stirring rate.

According to the present invention, based on 100 parts by weight deionized water, the first acrylic acid and the acrylamide are in 1-15 parts by weight total amount, the starch is in 1-10 parts by weight, the acidity neutralizer is in 0.5-5 parts by weight, the cross-linking agent is in 0.1-0.8 parts by weight, the initiating agent is in 1-9 parts by weight, and the strength improving material is in 20-70 parts by weight.

According to the present invention, in the step (3), the first acrylic acid, the acrylamide, the strength improving material, the gelatinized colloid, and the acrylate are controlled to have a polymerization reaction in the presence of a cross-linking agent and an initiating agent, wherein, the polymerization reaction may be carried out in oil bath, and the conditions of the polymerization reaction in the oil bath include: 40-60° C. reaction temperature and 6-7 h reaction time; preferably, the polymerization reaction is carried out under a stirring condition; for example, the stirring rate may be 1,200-1,600 rpm, preferably is 1,400-1,500 rpm; in addition, the reaction situation is observed from time to time, and the stirring is stopped when the polymerization system form viscoelastic gel in the polymerization reaction.

According to the present invention, the method further comprises finely shearing or cutting the synthesized product into fine granules with a pair of scissors or a cutter after the polymerization product is cooled down, loading the particles into a constant-temperature oven, and drying the particles continuously at 50-70° C. till the weight doesn't change any more, so as to obtain a synthesized granular water-swelling plugging agent.

In a third aspect, the present invention provides a micro-capsule plugging agent for drilling fluid, comprising an intra-capsular material and a capsular enclosure material that encloses the intra-capsular material, wherein the intra-capsular material is the above-mentioned expandable plugging agent or the expandable plugging agent prepared with the above-mentioned method, the capsular enclosure material is one or more of paraffin, stearic acid, bee wax, Japan wax, long-chain alcohol, polyethylene with molecular weight lower than 5,000, solidified oil, and deformable resin, preferably is paraffin.

Preferably, the dose ratio of the capsular enclosure material to the intra-capsular material is (2-5):1.

According to the present invention, the diameter of the micro-capsule plugging agent may be 2-1,000 μm, preferably is 500-700 μm; the thickness of the capsular enclosure material may be 0.2-200 μm, preferably is 45-65 μm.

In a fourth aspect, the present invention provides a water-based drilling fluid containing the above-mentioned expandable plugging agent or the expandable plugging agent prepared with the above-mentioned method and the above-mentioned micro-capsule plugging agent;

Preferably, based on the total weight of 100 mL water-based drilling fluid, the dose of the expandable plugging agent is 10-12 wt %, or the dose of the micro-capsule plugging agent is 6-8 wt %.

In addition, the water-based drilling fluid may contain one or more of water, bentonite, a filtrate reducer, a flow pattern regulator and a lubricant.

According to the present invention, based on the total weight of 100 mL water-based drilling fluid, the content of the bentonite is 3-5 parts by weight, the content of the filtrate reducer is 5-8 parts by weight, the content of the flow pattern regulator is 2-6 parts by weight, and the content of the lubricant is 1-5 parts by weight.

In a fifth aspect, the present invention provides a method of drilling in oil and gas fields, wherein use of the above-mentioned expandable plugging agent or the expandable plugging agent prepared with the above-mentioned method and the above-mentioned micro-capsule plugging agent. For example, specifically the method may be application in the plugging work in the well drilling process in oil fields.

Hereunder the present invention will be detailed in examples.

In the following examples and comparative examples:

The acrylic acid (AA) (grade: analytically pure), acrylamide (AM) (grade: analytically pure), starch (grade: analytically pure), sodium hydroxide (NaOH) (grade: analytically pure), N,N-methylene-bis acrylamide (grade: analytically pure), ammonium persulfate (grade: analytically pure), sodium sulfite (grade, analytically pure) and superfine calcium carbonate powder (grade: commercially pure) are from Chengdu Kelong Chemical Reagent Plant.

The electronic balance is at 0.0001 g precision and from Shanghai Balance Instrument Plant.

The controlled constant-temperature oven is model GZX-9240 from Shanghai Bo-Xun Industry Co., Ltd.

The constant-temperature oil bath pan is model HH-S1 from Changzhou Aohua Instrument Co., Ltd.

The motor stirrer is model JB50-D from Shanghai Specimen and Model Factory.

The synthesizer is from Chengdu Kelong Chemical Reagent Plant.

Performance Test:

1. Water Absorptivity

Water absorptivity is an important parameter for evaluating the performance of a water-absorbing plugging agent. It characterizes the water-absorbing capacity and is measured by a water absorption multiple. Specifically, it refers to the quantity of water that can be absorbed by 1 g plugging agent, in unit of g/g, and expressed by the following formula:

$$Q(g/g) = (m_2 - m_1)/m_1, \qquad (1)$$

wherein Q is water absorptivity, $m_1$ is the mass of the expandable plugging agent before swelling, and $m_2$ is the mass of the expandable plugging agent after swelling.

2. Strength of Plugging Agent

The strength of a plugging agent defines the retention ability of the plugging agent in a leaking formation.

The gel strength of a plugging agent may be expressed by elastic modulus, which is a physical quantity that describes the elasticity of a material, and the value of which is a ratio of stress to strain of the material in the elastic deformation stage.

In the present invention, the elastic modulus is tested with the following method:

(1) a certain amount of expandable plugging agent in a regular volume shape is placed in distilled water, and the expandable plugging agent is taken out and kept in a still state after it absorbs water to a saturated state;

(2) the expandable plugging agent is placed in a plastic box (the length, width, and height are a, b, and c), and the initial height $L_0$ of the expandable plugging agent is measured;

(3) a weight in mass m is placed on the top of the expandable plugging agent carefully, and the height L of the expandable plugging agent with the weight is measured, and thereby the following parameters are obtained:

$$\text{Amount of deformation: } \Delta L = L_0 - L \qquad (2)$$

$$\text{Elastic modulus: } E = (mgL_0)/a \times b(L_0 - L) \qquad (3)$$

3. Liquid Absorption Rate

The liquid absorption rate is usually defined as the mass of liquid absorbed by an expandable plugging agent in unit mass in unit time. The liquid absorption rate is one of important performance indexes of an expandable plugging agent. The liquid absorption rate may be measured with a variety of methods, including gel volume expansion measurement method, gel mass measurement method, and capillary method, etc.

4. Liquid Retentivity

The liquid retentivity is the ability of an expandable plugging agent that retains its water solution in a non-segregated state after the expandable plugging agent absorbs liquid. The liquid retentivity includes: liquid retentivity under natural condition, liquid retentivity under thermal condition, liquid retentivity under pressure condition and liquid retentivity under vacuum condition, etc. Usually the liquid retentivity under thermal condition is used as the evaluation index.

The liquid retentivity is a ratio of the mass of water retained by gel after evaporation to the mass of the expandable plugging agent before evaporation:

$$H_p = (m_{p2}/m_{p1}) \times 100\% \quad (4)$$

where, $H_p$ is liquid retentivity, $m_{p2}$ is the mass of the expandable plugging agent before evaporation, and $m_{p1}$ is the mass after evaporation.

5. Salt Resistance

The salt resistance is determined by measuring the liquid absorptivity of an expandable plugging agent in the mineralized water in an oil field or NaCl and $CaCl_2$ saline water at different concentrations, and usually the salinity resistance is deemed as good if the liquid absorptivity is equal to or higher than 30 times.

The average particle diameter is tested with a laser particle size analyzer Model Mastrsizer 2000 from Malvern Panalytical.

Example 1

This example is provided to describe the expandable plugging agent and the preparation method of the expandable plugging agent in the present invention.

(1) 100 g deionized water is injected into a beaker, and sodium hydroxide is added into the beaker under a stirring condition at 1,500 rpm stirring rate, to prepare sodium hydroxide solution at 40 wt % concentration; and the obtained sodium hydroxide solution is controlled to have a neutralization reaction with second acrylic acid in an appropriate amount;

(2) 100 g deionized water is injected into a beaker, 5 g starch is added into the beaker under a stirring condition at 1,500 rpm stirring rate, the mixture is stirred for 30 min. at 1,500 rpm stirring rate after the starch is dissolved fully, so that the mixture becomes gelatinized colloid, the apparent viscosity of which is 20 mPa·s;

(3) 2.3 g first acrylic acid and 4.7 g acrylamide are added into the pasty colloid obtained in the step (2) under a stirring condition at 1,500 rpm stirring rate, and then the mixture is stirred at 1,500 rpm stirring rate and the sodium acrylate obtained in the step (1) is added by dropwise adding into the mixture at 2 mL/min. rate for reaction, after the first acrylic acid and the acrylamide are fully dissolved to a homogeneous state;

(4) 0.4 g N,N-methylene-bis acrylamide, 1.7 g ammonium persulfate, 2.8 g sodium sulfite, 14 g calcium carbonate A, 14 g calcium carbonate B, and 27 g walnut shell are added sequentially into the mixed solution obtained in the step (3), and the obtained mixture is controlled to have a polymerization reaction at 60□ temperature for 6 h under a stirring condition; wherein, the average particle diameter of the calcium carbonate A is 8 µm, the average particle diameter of the calcium carbonate B is 4 µm, and the average particle diameter of the walnut shell is 18 µm;

(5) the viscoelastic colloid obtained in the step (4) is sheared into fine granules after it is cooled down, and then the fine granules are placed in a constant-temperature oven and dried at 60 □.

The properties of an obtained expandable plugging agent S1 are shown in Table 1.

Example 2

This example is provided to describe the expandable plugging agent and the preparation method of the expandable plugging agent in the present invention.

(1) 100 g deionized water is injected into a beaker, and sodium hydroxide is added into the beaker under a stirring condition at 1,400 rpm stirring rate, to prepare sodium hydroxide solution at 38 wt % concentration; and the obtained sodium hydroxide solution is controlled to have a neutralization reaction with second acrylic acid in an appropriate amount;

(2) 100 g deionized water is injected into a beaker, 4 g starch is added into the beaker under a stirring condition at 1,500 rpm stirring rate, the mixture is stirred for 40 min. at 1,500 rpm stirring rate after the starch is dissolved fully, so that the mixture becomes gelatinized colloid, the apparent viscosity of which is 30 mPa·s;

(3) 3 g first acrylic acid and 4.2 g acrylamide are added into the pasty colloid obtained in the step (2) under a stirring condition at 1,400 rpm stirring rate, and then the mixture is stirred at 1,400 rpm stirring rate and the sodium acrylate obtained in the step (1) is added by dropwise adding into the mixture at 2 mL/min. rate for reaction, after the first acrylic acid and the acrylamide are fully dissolved to a homogeneous state;

(4) 0.3 g N,N-methylene-bis acrylamide, 1 g ammonium persulfate, 2.5 g sodium sulfite, 15 g calcium carbonate A, 15 g calcium carbonate B, and 37.5 g walnut shell are added sequentially into the mixed solution obtained in the step (3), and the obtained mixture is controlled to have a polymerization reaction at 40° C. temperature for 7 h under a stirring condition; wherein, the average particle diameter of the calcium carbonate A is 12 µm, the average particle diameter of the calcium carbonate B is 6 µm, and the average particle diameter of the walnut shell is 22 µm;

(5) the viscoelastic colloid obtained in the step (4) is sheared into fine granules after it is cooled down, and then the fine granules are placed in a constant-temperature oven and dried at 60° C.

The properties of an obtained expandable plugging agent S2 are shown in Table 1.

Example 3

This example is provided to describe the expandable plugging agent and the preparation method of the expandable plugging agent in the present invention.

(1) 100 g deionized water is injected into a beaker, and sodium hydroxide is added into the beaker under a stirring condition at 1,450 rpm stirring rate, to prepare sodium hydroxide solution at 42 wt % concentration; and the obtained sodium hydroxide solution is controlled to have a neutralization reaction with second acrylic acid in an appropriate amount;

(2) 100 g deionized water is injected into a beaker, 6 g starch is added into the beaker under a stirring condition at 1,500 rpm stirring rate, the mixture is stirred for 45 min. at 1,500 rpm stirring rate after the starch is dissolved fully, so that the mixture becomes gelatinized colloid, the apparent viscosity of which is 50 mPa·s;

(3) 4 g first acrylic acid and 6 g acrylamide are added into the pasty colloid obtained in the step (2) under a stirring condition at 1,450 rpm stirring rate, and then the mixture is stirred at 1,450 rpm stirring rate and the sodium acrylate obtained in the step (1) is added by dropwise adding into the mixture at 2 mL/min. rate for reaction, after the first acrylic acid and the acrylamide are fully dissolved to a homogeneous state;

(4) 0.5 g N,N-methylene-bis acrylamide, 2.4 g ammonium persulfate, 3 g sodium sulfite, 16 g calcium carbonate A, 16 g calcium carbonate B, and 26.67 g walnut shell are added sequentially into the mixed solution obtained in the step (3), and the obtained mixture is controlled to have a polymerization reaction at 50° C. temperature for 6.5 h under a stirring condition; wherein, the average particle diameter of the calcium carbonate A is 10 μm, the average particle diameter of the calcium carbonate B is 5um, and the average particle diameter of the walnut shell is 20 μm;

(5) the viscoelastic colloid obtained in the step (4) is sheared into fine granules after it is cooled down, and then the fine granules are placed in a constant-temperature oven and dried at 60° C.

The properties of an obtained expandable plugging agent S3 are shown in Table 1.

Example 4

This example is provided to describe the expandable plugging agent and the preparation method of the expandable plugging agent in the present invention.

An expandable plugging agent is prepared with the method described in the example 1, except for the following difference: the total content of the first acrylic acid and the acrylamide is 6 g, and the mass ratio of the content of the first acrylic acid to the content of the acrylamide is 0.8:1. The properties of an obtained expandable plugging agent S4 are shown in Table 1.

Example 5

This example is provided to describe the expandable plugging agent and the preparation method of the expandable plugging agent in the present invention.

An expandable plugging agent is prepared with the method described in the example 1, except for the following difference: the initiating agent is a mixture of ammonium persulfate and sodium sulfite, the total content of the ammonium persulfate and the sodium sulfite is 4 g, and the mass ratio of the content of the ammonium persulfate to the content of the sodium sulfite is 0.5:1. The properties of an obtained expandable plugging agent S5 are shown in Table 1.

Example 6

This example is provided to describe the expandable plugging agent and the preparation method of the expandable plugging agent in the present invention.

An expandable plugging agent is prepared with the method described in the example 1, except for the following difference: 100 g deionized water is injected into a beaker, and 7 g starch is added into the beaker under a stirring condition at 1,500 rpm stirring rate. The properties of an obtained expandable plugging agent S6 are shown in Table 1.

Example 7

This example is provided to describe the expandable plugging agent and the preparation method of the expandable plugging agent in the present invention.

An expandable plugging agent is prepared with the method described in the example 1, except for the following difference: the mass ratio of the calcium carbonate A to the calcium carbonate B to the walnut shell is 0.4:0.6:1. The properties of an obtained expandable plugging agent S7 are shown in Table 1.

Example 8

This example is provided to describe the expandable plugging agent and the preparation method of the expandable plugging agent in the present invention.

An expandable plugging agent is prepared with the method described in the example 1, except for the following difference: the mass ratio of the calcium carbonate A to the calcium carbonate B to the walnut shell is 0.6:0.4:1. The properties of an obtained expandable plugging agent S8 are shown in Table 1.

Examples 9-16

These examples are provided to describe the microcapsule plugging agent provided in the present invention.

A melting—dispersion—condensation method is used: paraffin is heated and melted into a liquid state, then the expandable plugging agents S1-S8 prepared in the examples 1-8 are thrown into the liquid paraffin respectively to form dispersion liquids; the paraffin material forms a layer of enclosing film outside the capsule core when the temperature of the dispersion system drops to be lower than the melting point of paraffin, and thereby micro-capsule plugging agents S9-S16 are formed. The properties of an obtained expandable plugging agents S9-S16 are shown in Table 1.

Comparative Example 1

An expandable plugging agent is prepared with the method described in the example 1, except for the following difference: the step (2) is omitted, i.e., starch is not added, specifically:

(1) 100 g deionized water is injected into a beaker, and sodium hydroxide is added into the beaker under a stirring condition at 1,500 rpm stirring rate, to prepare sodium hydroxide solution at 40 wt % concentration; and the obtained sodium hydroxide solution is controlled to have a neutralization reaction with second acrylic acid in an appropriate amount;

(2) the sodium acrylate obtained in the step (1) is added by dropwise adding at 2 mL/min. rate into a mixture of 2.3 g first acrylic acid and 4.7 g acrylamide under a stirring condition at 1,500 rpm stirring rate;

(3) 0.4 g N,N-methylene-bis acrylamide, 1.7 g ammonium persulfate, 2.8 g sodium sulfite, 14 g calcium carbonate A, 14 g calcium carbonate B, and 27 g walnut shell are added sequentially into the mixed solution obtained in the step (2), and the obtained mixture is controlled to have a polymerization reaction at 60° C. temperature for 6 h under a stirring condition; wherein, the average particle diameter of the calcium carbonate A is 8 μm, the average particle diameter of the calcium carbonate B is 4 μm, and the average particle diameter of the walnut shell is 18 μm;

(4) the viscoelastic colloid obtained in the step (3) is sheared into fine granules after it is cooled down, and then the fine granules are placed in a constant-temperature oven and dried at 60° C.

The properties of an obtained expandable plugging agent DS1 are shown in Table 1.

Comparative Example 2

An expandable plugging agent is prepared with the method described in the example 1, except for the following difference: the first acrylic acid and the sodium acrylate are not added. The properties of an obtained expandable plugging agent DS2 are shown in Table 1.

Comparative Example 3

An expandable plugging agent is prepared with the method described in the example 1, except for the following difference: the acrylamide is not added. The properties of an obtained expandable plugging agent DS3 are shown in Table 1.

Comparative Example 4

An expandable plugging agent is prepared with the method described in the example 1, except for the following difference: the mass ratio of the first acrylic acid to the acrylamide is 1:1. The properties of an obtained expandable plugging agent DS4 are shown in Table 1.

Comparative Example 5

An expandable plugging agent is prepared with the method described in the example 1, except for the following difference: the mass ratio of the calcium carbonate A to the calcium carbonate B to the walnut shell is 1:1:1. The properties of an obtained expandable plugging agent DS5 are shown in Table 1.

Comparative Example 6

An expandable plugging agent is prepared with the method described in the example 1, except for the following difference: the starch is not gelatinized, i.e., the starch is added directly, specifically:

(1) 100 g deionized water is injected into a beaker, and sodium hydroxide is added into the beaker under a stirring condition at 1,500 rpm stirring rate, to prepare sodium hydroxide solution at 40 wt % concentration; and the obtained sodium hydroxide solution is controlled to have a neutralization reaction with second acrylic acid in an appropriate amount;

(2) 2.3 g first acrylic acid, 4.7 g acrylamide, and 5 g starch are added under a stirring condition at 1,500 rpm stirring rate, and then the mixture is stirred at 1,500 rpm stirring rate and the sodium acrylate obtained in the step (1) is added by dropwise adding into the mixture at 2 mL/min. rate for reaction;

(3) 0.4 g N,N-methylene-bis acrylamide, 1.7 g ammonium persulfate, 2.8 g sodium sulfite, 14 g calcium carbonate A, 14 g calcium carbonate B, and 27 g walnut shell are added sequentially into the mixed solution obtained in the step (2), and the obtained mixture is controlled to have a polymerization reaction at 60° C. temperature for 6 h under a stirring condition; wherein, the average particle diameter of the calcium carbonate A is 8 μm, the average particle diameter of the calcium carbonate B is 4 μm, and the average particle diameter of the walnut shell is 18 μm;

(4) the viscoelastic colloid obtained in the step (3) is sheared into fine granules after it is cooled down, and then the fine granules are placed in a constant-temperature oven and dried at 60° C.

The properties of an obtained expandable plugging agent DS6 are shown in Table 1.

Comparative Example 7

An expandable plugging agent is prepared with the method described in the example 1, except for the following difference: the total dose of the ammonium persulfate and the sodium sulfite in the initiating agent is 10 g, and the mass ratio of the ammonium persulfate to the sodium sulfite is 1:1. The properties of an obtained expandable plugging agent DS7 are shown in Table 1.

Comparative Example 8

An expandable plugging agent is prepared with the method described in the example 1, except for the following difference: the apparent viscosity of the gelatinized colloid obtained through gelatinization of starch is 10 mPa·s. The properties of an obtained expandable plugging agent DS8 are shown in Table 1.

TABLE 1

| | Liquid absorptivity g/g | Liquid retentivity % | Salt resistance % | Elastic modulus × $10^4$Pa | Tensile strength N/cm$^2$ |
|---|---|---|---|---|---|
| S1 | 180 | 78 | 20 | 11 | 4920 |
| S2 | 175 | 72 | 18 | 10.56 | 4850 |
| S3 | 178 | 74 | 19 | 10.49 | 4870 |
| S4 | 170 | 70 | 16 | 10.24 | 4680 |
| S5 | 165 | 68 | 17 | 9.85 | 4750 |
| S6 | 170 | 71 | 17 | 9.71 | 4660 |
| S7 | 157 | 70 | 15 | 9.95 | 4710 |
| S8 | 180 | 75 | 15 | 9.25 | 4690 |
| S9 | 178 | 80 | 25 | 11.54 | 4930 |
| S10 | 178 | 75 | 23 | 11.21 | 4870 |
| S11 | 172 | 77 | 23 | 11.11 | 4860 |
| S12 | 170 | 74 | 21 | 10.42 | 4670 |
| S13 | 169 | 72 | 20 | 10.18 | 4710 |
| S14 | 171 | 74 | 22 | 10.27 | 4630 |
| S15 | 175 | 72 | 19 | 10.08 | 4780 |
| S16 | 168 | 73 | 19 | 10.02 | 4610 |
| DS1 | 121 | 41 | 10 | 6.45 | 2180 |
| DS2 | 110 | 32 | 11 | 6.94 | 2360 |
| DS3 | 98 | 38 | 5 | 5.15 | 1980 |
| DS4 | 105 | 44 | 8 | 5.28 | 2650 |
| DS5 | 109 | 41 | 13 | 6.18 | 2380 |
| DS6 | 115 | 45 | 7 | 4.24 | 2200 |
| DS7 | 102 | 40 | 9 | 5.92 | 2530 |
| DS8 | 113 | 44 | 8 | 4.35 | 2490 |

It is seen from the results in Table 1: the expandable plugging agents in the examples S1-S8 and the microcapsule plugging agents in the examples S9-S16 in the present invention have liquid absorptivity equal to or above 150 g/g and liquid rententivity equal to or above 65%, can function normally in sodium chloride solution at concentration up to 25%, and have elastic modulus equal to or above $9 \times 10^4$ Pa. The results indicate the plugging agents have good liquid absorptivity, good liquid rententivity, and good salinity resistance property, and have high strength and can attain a good effect.

Application Examples Y1-Y16

These application examples are provided to describe the water-based drilling fluid provided in the present invention.

Formulation of the water-based drilling fluid: 100 parts by weight water, 10 parts by weight expandable plugging agent or micro-capsule plugging agent, 4 parts by weight bentonite, 7 parts by weight filtrate reducer, 4 parts by weight flow pattern regulator, and 3 parts by weight lubricant; the components are stirred and mixed to a homogeneous state, to prepare water-based drilling fluids Y1-Y16.

Reference Application Examples DY1-DY8

Water-based drilling fluids are prepared with the method described in the application example 11, except for the following difference: the expandable plugging agent or the micro-capsule plugging agent is not used; thus, water-based drilling fluids DY1-DY8 are obtained.

Test Case 1

The plugging performance is tested with a medium pressure sand bed test method. Specifically, the method includes the following steps:

1. Φ6 mm steel balls are filled into a 25 cm long-tube instrument to simulate a porous formation;
2. 200 mL prepared water-based drilling fluids Y1-Y16 and DY1-DY8 are loaded into the testing instrument respectively;
3. the steel balls are squeezed by charging nitrogen, to simulate the situation of downhole drilling fluid flowing through fractures.

The water-based drilling fluids Y1-Y16 and DY1-DY8 are applied in the plugging work in the drilling process in an oil and gas field, and the plugging performance is tested respectively. The results are shown in Table 2.

TABLE 2

| Drilling Fluid | 10 min | 40 min |
| --- | --- | --- |
| Y1 | Invasion amount: about 8 mL, invasion depth: 0.4 cm | Invasion amount: about 12 mL, invasion depth: 0.6 cm |
| Y2 | Invasion amount: about 9 mL, invasion depth: 0.4 cm | Invasion amount: about 13 mL, invasion depth: 0.6 cm |
| Y3 | Invasion amount: about 8 mL, invasion depth: 0.4 cm | Invasion amount: about 12 mL, invasion depth: 0.5 cm |
| Y4 | Invasion amount: about 12 mL, invasion depth: 0.6 cm | Invasion amount: about 17 mL, invasion depth: 0.8 cm |
| Y5 | Invasion amount: about 13 mL, invasion depth: 0.7 cm | Invasion amount: about 17 mL, invasion depth: 0.9 cm |
| Y6 | Invasion amount: about 12 mL, invasion depth: 0.7 cm | Invasion amount: about 16 mL, invasion depth: 0.8 cm |
| Y7 | Invasion amount: about 14 mL, invasion depth: 0.7 cm | Invasion amount: about 17 mL, invasion depth: 0.9 cm |
| Y8 | Invasion amount: about 13 mL, invasion depth: 0.6 cm | Invasion amount: about 17 mL, invasion depth: 0.8 cm |
| Y9 | Invasion amount: about 12 mL, invasion depth: 0.7 cm | Invasion amount: about 16 mL, invasion depth: 0.8 cm |
| Y10 | Invasion amount: about 13 mL, invasion depth: 0.7 cm | Invasion amount: about 17 mL, invasion depth: 0.9 cm |
| Y11 | Invasion amount: about 14 mL, invasion depth: 0.8 cm | Invasion amount: about 19 mL, invasion depth: 1 cm |
| Y12 | Invasion amount: about 12 mL, invasion depth: 0.6 cm | Invasion amount: about 16 mL, invasion depth: 0.8 cm |
| Y13 | Invasion amount: about 13 mL, invasion depth: 0.7 cm | Invasion amount: about 18 mL, invasion depth: 0.8 cm |
| Y14 | Invasion amount: about 12 mL, invasion depth: 0.7 cm | Invasion amount about 19 mL, invasion depth: 0.9 cm |
| Y15 | Invasion amount: about 11 mL, invasion depth: 0.6 cm | Invasion amount: about 16 mL, invasion depth: 0.7 cm |
| Y16 | Invasion amount: about 12 mL, invasion depth: 0.7 cm | Invasion amount: about 17 mL, invasion depth: 0.7 cm |
| DY1 | Invasion amount: about 120 mL, invasion depth: 11 cm | Invasion amount: about 162 mL, invasion depth: 18 cm |
| DY2 | Invasion amount: about 132 mL, invasion depth: 13 cm | Invasion amount: about 170 mL, invasion depth: 19 cm |
| DY3 | Invasion amount: about 116 mL, invasion depth: 10 cm | Invasion amount: about 158 mL, invasion depth: 16 cm |
| DY4 | Invasion amount: about 145 mL, invasion depth: 15 cm | Invasion amount: about 182 mL, invasion depth: 21 cm |
| DY5 | Invasion amount: about 183 mL, invasion depth: 22 cm | Invasion amount: about 200 mL, invasion depth: 25 cm |
| DY6 | Invasion amount: about 160 mL, invasion depth: 16 cm | Invasion amount: about 192 mL, invasion depth: 18 cm |
| DY7 | Invasion amount: about 198 mL, invasion depth: 23 cm | Invasion amount: about 200 mL, invasion depth: 25 cm |
| DY8 | Invasion amount: about 152 mL, invasion depth: 11 cm | Invasion amount: about 193 mL, invasion depth: 23 cm |

It is seen from the data in Table 2: at normal temperature and normal pressure, the invasion amounts of Y1-Y16 are not greater than 20 mL, and the invasion depths are not greater than 1 cm; in contrast, the invasion amounts of DY1-DY8 are greater than 110 mL, even the DY5 and DY7 are fully lost after 40 min., the invasion depths are greater than 10 mm. The data indicates the water-based drilling fluid provided in the present invention has excellent plugging performance.

While the present invention is described above in detail in some preferred examples, the present invention is not limited to those examples. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

What is claimed is:

1. An expandable plugging agent for drilling fluid, which is viscoelastic gel obtained through a polymerization reaction of first acrylic acid, acrylamide, acrylate, a strength improving material, and gelatinized colloid in the presence of a cross-linking agent and an initiating agent, wherein the acrylate is obtained through a neutralization reaction of an acidity neutralizer and second acrylic acid, and the gelatinized colloid is obtained through a gelatinization reaction of starch in deionized water, wherein the first acrylic acid and the second acrylic acid are acrylic acid, the first acrylic acid participates in reaction with acrylamide, and the second acrylic acid participates in the neutralization reaction, wherein based on 100 parts by weight deionized water, the first acrylic acid and the acrylamide are in 1-15 parts by weight total amount, the starch is in 1-10 parts by weight, the acidity neutralizer is in 0.5-5 parts by weight, the cross-linking agent is in 0.1-0.8 parts by weight, the initiating agent is in 1-9 parts by weight, and the strength improving material is in 20-70 parts by weight.

2. The expandable plugging agent according to claim 1, wherein the cross-linking agent is one or more of N,N-methylene-bis acrylamide, N-methylol acrylamide, and diacetone acrylamide.

3. The expandable plugging agent according to claim 1, wherein the strength improving material is calcium carbonate and/or walnut shell.

4. The expandable plugging agent according claim 1, wherein the water absorption multiple of the expandable plugging agent is 150-180, the relative molecular weight is $5 \times 10^5$ to $8 \times 10^5$, the elastic modulus is $9 \times 10^4$ to $12 \times 10^4$ Pa, and the tensile strength is 4,500-5,000N/cm².

5. A method for preparing the expandable plugging agent according to claim 1, comprising:
   (1) adding starch into deionized water to have the gelatinization reaction to obtain gelatinized colloid;
   (2) adding the acidity neutralizer and acrylic acid to have the neutralization reaction to obtain the acrylate;
   (3) controlling first acrylic acid, acrylamide, the acrylate, the strength improving material, and the gelatinized colloid to have the polymerization reaction in the presence of the cross-linking agent and the initiating agent.

6. The method according to claim 5, wherein in the step (3), the conditions of the polymerization reaction include: 40-60° C. reaction temperature and 6-7 h reaction time.

7. A micro-capsule plugging agent for drilling fluid, comprising an intra-capsular material and a capsular enclosure material that encloses the intra-capsular material, wherein the intra-capsular material is
   the expandable plugging agent according to claim 1 and
   the capsular enclosure material is one or more of paraffin, stearic acid, bee wax, Japan wax, long-chain alcohol, polyethylene with number-average molecular weight lower than 5,000 g/mol, solidified oil, and deformable resin.

8. The expandable plugging agent according to claim 1, wherein the mass ratio of the first acrylic acid to acrylamide is (0.4-0.8):1.

9. The expandable plugging agent according to claim 8, wherein the acidity neutralizer is sodium hydroxide and/or calcium oxide.

10. The expandable plugging agent according to claim 2, wherein the initiating agent is a mixture of ammonium persulfate and sodium sulfite.

11. The expandable plugging agent according to claim 10, wherein the mass ratio of the ammonium persulfate to the sodium sulfite is (0.4-0.8):1.

12. The expandable plugging agent according to claim 3, wherein the calcium carbonate comprises calcium carbonate A and calcium carbonate B, the average particle diameter of the calcium carbonate A is 8-12 μm, and the average particle diameter of the calcium carbonate B is 4-6 μm.

13. The expandable plugging agent according to claim 12, wherein the average particle diameter of the walnut shell is 18-22 μm.

14. The expandable plugging agent according to claim 13, wherein the mass ratio of the calcium carbonate A to the calcium carbonate B to the walnut shell is (0.4-0.6):(0.4-0.6):1.

15. The micro-capsule plugging agent for drilling fluid according to claim 7, wherein the capsular enclosure material is paraffin.

16. The micro-capsule plugging agent for drilling fluid according to claim 15, wherein the weight ratio of the capsular enclosure material to the intra-capsular material is (2-5):1.

* * * * *